United States Patent
Knowles

(10) Patent No.: US 9,300,386 B2
(45) Date of Patent: Mar. 29, 2016

(54) WEARING POSITION DERIVED DEVICE OPERATION

(75) Inventor: Andrew Knowles, Southampton (GB)

(73) Assignee: Plantronics, Inc., Santa Cruz, CA (US)

(*) Notice: Subject to any disclaimer, the term of this patent is extended or adjusted under 35 U.S.C. 154(b) by 887 days.

(21) Appl. No.: 13/348,841

(22) Filed: Jan. 12, 2012

(65) Prior Publication Data

US 2013/0182867 A1 Jul. 18, 2013

(51) Int. Cl.
*H04R 25/00* (2006.01)
*H04B 5/00* (2006.01)
*H04B 7/00* (2006.01)
*H04B 7/08* (2006.01)
*H04R 1/10* (2006.01)

(52) U.S. Cl.
CPC ............ *H04B 7/0834* (2013.01); *H04R 1/1041* (2013.01); *H04R 2201/107* (2013.01); *H04R 2201/109* (2013.01)

(58) Field of Classification Search
CPC .... H04R 25/70; H04R 25/505; H04R 1/1041; H04R 2201/107; H04R 2201/109; H04B 7/0834
USPC ........... 381/74, 312, 370, 330, 374, 379, 385, 381/77, 79, 80, 81, 309, 314; 455/41.1, 455/41.3, 41.7, 500.1
See application file for complete search history.

(56) References Cited

U.S. PATENT DOCUMENTS

| | | | |
|---|---|---|---|
| 7,567,282 B2 | 7/2009 | Burson | |
| 8,577,289 B2* | 11/2013 | Schlub | G01B 7/023 343/702 |
| 2004/0052364 A1 | 3/2004 | Bodley et al. | |
| 2008/0132292 A1* | 6/2008 | Hansen et al. | 455/569.1 |
| 2008/0305709 A1* | 12/2008 | Chan | A63H 3/00 446/297 |
| 2009/0295648 A1* | 12/2009 | Dorsey | H01Q 1/2266 343/702 |
| 2010/0159840 A1 | 6/2010 | Rosener et al. | |
| 2011/0092157 A1 | 4/2011 | Clark et al. | |
| 2012/0082329 A1* | 4/2012 | Neumeyer | H04R 25/65 381/314 |
| 2012/0214412 A1* | 8/2012 | Schlub | G01B 7/023 455/41.1 |

* cited by examiner

*Primary Examiner* — Xu Mei
*Assistant Examiner* — William A Jerez Lora
(74) *Attorney, Agent, or Firm* — Richard A. Dunning, Jr.

(57) ABSTRACT

Methods and apparatuses for wearing position derived device operation are disclosed. In one example, methods and apparatuses are described herein using capacitive sensors to determine device antenna selection or user interface selection.

13 Claims, 10 Drawing Sheets

2 - headset
4 - first surface
6 - second surface
14 - earloop housing
20 - conductive material
22 - conductive material
24 - antenna
26 - sensor
28 - antenna
30 - sensor
32 - sensor
34 - sensor

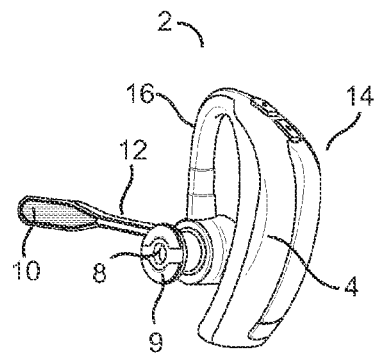
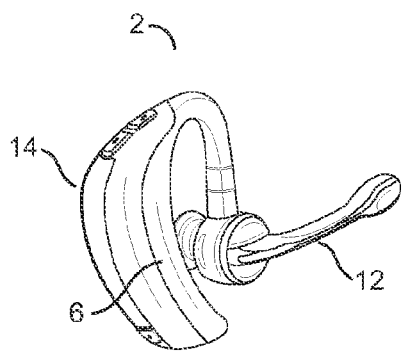
FIG. 1A  FIG. 1B
2 - headset
4 - first surface
6 - second surface
8 - receiver
9 - eartip
10 - microphone
12 - boom
14 - earloop housing
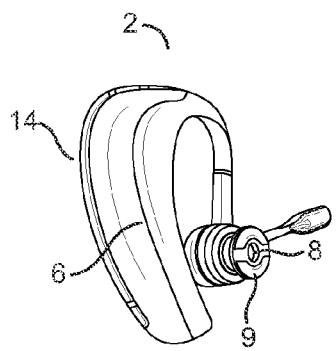
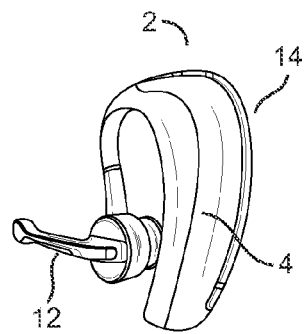
FIG. 2A  FIG. 2B 2 - headset
4 - first surface
6 - second surface
14 - earloop housing
20 - conductive material
22 - conductive material
24 - antenna
26 - sensor
28 - antenna
30 - sensor
32 - sensor
34 - sensor 20 - conductive material
22 - conductive material
46 - printed circuit board assembly

WEARING POSITION DERIVED DEVICE OPERATION

BACKGROUND OF THE INVENTION

Wireless headsets utilize antennas to transmit and receive wireless signals with a transceiver. Wireless headsets also require a user interface allowing the user to operate the headset. For example, the user interface must provide a means by which the user can input control commands to the headset. A typical headset may include, for example, power on/off buttons, mute control buttons, call control buttons, and volume control buttons. The user interface buttons may be implemented using mechanical switches or touch sensors. The user interface also includes an output mechanism to provide the user with headset status information, such as status indicator lights. As headsets increase in functionality, it is desirable to have a more complex user interface and/or more powerful transceiver, both of which require greater space.

However, the desired small headset form factor limits the space and placement options available for the antenna and user interface. Furthermore, users often desire a headset that can be worn on either ear. For headsets that can be worn on either ear, placement options for the antenna and user interface are further constrained. For example, antenna properties and performance may be adversely affected if placed in close proximity to the human body. The antenna must perform optimally regardless of the wearing position of the headset. Furthermore, the user interface must be accessible regardless of the wearing position of the headset.

As a result, improved methods and apparatuses for headset design and operation are needed.

BRIEF DESCRIPTION OF THE DRAWINGS

The present invention will be readily understood by the following detailed description in conjunction with the accompanying drawings, wherein like reference numerals designate like structural elements.

FIGS. 1A and 1B illustrate a left and right perspective view, respectively, of a headset adjusted to be worn on a wearer right ear.

FIGS. 2A and 2B illustrate a right and left perspective view, respectively, of the headset shown in FIGS. 1A and 1B adjusted to be worn on a wearer left ear.

DESCRIPTION OF SPECIFIC EMBODIMENTS

Figure 3:
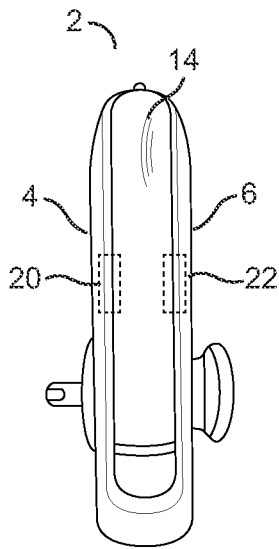
FIG. 3 illustrates a rear view of the headset shown in FIGS. 1A and 1B in one example.

Methods and apparatuses for wearing position derived headset operation are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

This invention relates to wearing position derived operation of head worn devices. In one example, methods and apparatuses are described herein using capacitive or alternative proximity detectors to determine device antenna selection or active switch selection. Methods and apparatuses are described using a single structure as both an antenna and a capacitive sensor.

In one example, capacitive sensors or any other form of proximity detectors are used to detect the wearing position (e.g., left side or right side) of the headset. This information is used to determine which antenna and/or user interface (e.g., switches or sensors) are to be enabled. For example, capacitive sensors placed on the left hand side of the headset body would be activated when placed on the user's right ear. The switches/antenna on the right hand side of the headset's body would then be enabled. If capacitive sensors are used, the wearing position sensors can also be used as capacitive "switches". Similarly, the antenna structures may be used as sensors using time division switching techniques.

In one configuration, identical sensors are mounted on the left and right hand sides of the headset body. When the sensors on the left side of the headset body are activated (user's right side wearing position), the sensors on the right side of the headset body will be enabled as, for example, volume control switches. Conversely, if the headset is positioned on the user's left side, the sensors on the left side will be enabled as switches. In one example, two sensors mounted within the body of the headset on the right hand side and two identical sensors are mounted on the left hand side of the body.

In another configuration, identical sensors and antennas are mounted on the left and right hand sides of the headset body. When the sensor on the left side is activated (user's right side wearing position), the antenna on the right side will be enabled. Conversely, if the headset is positioned on the user's left side, the antenna on the left side will be enabled. An antenna is mounted within the body of the headset on the right hand side and an identical antenna is mounted on the left hand side. A sensor is mounted within the body of the headset on the right hand side and an identical sensor is mounted on the left hand side.

In another configuration, the sensor and the antenna share the same mechanical structure. Two identical structures are mounted within the body of the headset on the right hand and left hand sides. Each structure is used as both the sensor and antenna. The structures are mounted on the left and right hand sides of the headset body. Each structure may be configured as either a capacitive sensor or antenna. At power up, one structure will be configured as a sensor and the other configured as an antenna. The role of each structure is swapped periodically until one of the sensors is activated, indicating that the device in being worn or has been placed on/against a dielectric material. When detection occurs, the role of the structures are fixed such that the structure configured as the sensor continues to operate as a sensor and the structure configured as the antenna continues to operate as the antenna. The role of each structure will continue in this configuration until the sensor is deactivated, at which point the periodic role swapping we resume.

Advantageously, greater flexibility in determining the location of the antenna and/or capacitive switches on wireless devices such as headsets is provided. Furthermore, by allowing the placement of the antenna in use in an optimal position, the usable range of the headset or other wireless device implementing the apparatuses and methods described herein is increased.

The same or similar methods could be applied to a variety of wearable or handheld devices; for example, a handheld device could have capacitive sensors on its top and bottom surfaces, one or more sensors would be activated due to their proximity to the palm of the hand when held and the device could then use the sensors on the other side for user input. In another example, a device may be placed in a user's pocket and the appropriate antenna could be selected depending on which way round the device was orientated in the pocket.

In one example, an electronic device includes a housing having a first surface adapted to contact a user body and a second surface adapted to contact the user body. A first conductive material is disposed on or in proximity to the first surface, the first conductive material operable as a first capacitive sensor or a first antenna. A second conductive material is disposed on or in proximity to the second surface, the second conductive material operable as a second capacitive sensor or a second antenna. In one example, the electronic device is a headset and the first surface is adapted to contact a user head when the housing is worn on a user right ear and the second surface is adapted to contact the user head when the housing is worn on a user left ear.

In one example, a method for selecting an antenna for use by an electronic device includes alternating operation of a first conductive material as a first capacitive sensor and a first antenna. Operation of a second conductive material is alternated as a second capacitive sensor and a second antenna. The method includes detecting a first capacitive sensor output associated with proximity to a user body or a second capacitive sensor output associated with proximity to a user body. Responsive to detecting the first capacitive sensor output, the second conductive material is operated as an antenna. Responsive to detecting the second capacitive sensor output, the first conductive material is operated as an antenna. For example, the electronic device may be a headset.

In one example, a method for selecting an antenna for use by an electronic device includes detecting proximity of an electronic device to a user body utilizing a first conductive material operable as a first sensor or proximity of the electronic device to the user body utilizing a second conductive material operable as a second sensor. Responsive to detecting proximity of the electronic device to the user body utilizing the first conductive material, the second conductive material is operated as an antenna. Responsive to detecting proximity of the electronic device to the user body utilizing the first conductive material, the first conductive material is operated as an antenna.

In one example, a method for selecting an antenna for use by a headset includes detecting placement of a headset on a left ear utilizing a first conductive material operable as a first sensor, or placement of the headset on a right ear utilizing a second conductive material operable as a second sensor. Responsive to detecting placement of the headset on the left ear, the second conductive material is operated as an antenna. Responsive to detecting placement of the headset on the right ear, the first conductive material is operated as an antenna.

In one example, a headset includes a housing having a first surface adapted to contact a user head when the housing is worn on a user right ear and a second surface adapted to contact the user head when the housing is worn on a user left ear. The headset includes a first sensor disposed on or in proximity to the first surface, and a second sensor disposed on or in proximity to the second surface. The headset further includes a first antenna disposed on or in proximity to the first surface, and a second antenna disposed on or in proximity to the second surface.

In one example, a method for selecting an antenna for use by a headset includes detecting whether a headset is being worn on a left ear or a right ear, the headset including a first antenna and a second antenna. Responsive to detecting the headset is being worn on a left ear, the first antenna is selected for use. Responsive to detecting the headset is being worn on a right ear, the second antenna is selected for use.

In one example, a headset includes a housing having a first surface adapted to contact a user head when the housing is worn on a user right ear and a second surface adapted to contact the user head when the housing is worn on a user left ear. A first sensor is disposed on or in proximity to the first surface, the first sensor adapted to operate as a donned or doffed detector when the headset is worn on the user right ear and operate as a user interface to receive a user input via a user finger when the headset is worn on the user left ear. A second sensor is disposed on or in proximity to the second surface, the second sensor adapted to operate as a donned or doffed detector when the headset is worn on the user left ear and operate as a user interface to receive a user input via a user finger when the headset is worn on the user right ear.

FIGS. 1A and 1B illustrate a left and right perspective view, respectively, of a headset 2 adjusted to be worn on a wearer right ear. FIGS. 2A and 2B illustrate a right and left perspective view, respectively, of the headset 2 shown in FIGS. 1A and 1B adjusted to be worn on a wearer left ear. Headset 2 includes an earloop housing 14 (e.g., the main housing), a receiver unit 8 with ear tip 9, microphone 10, and microphone boom 12.

When worn, the earloop housing 14 is placed behind the wearer ear so that the receiver and eartip 9 rest comfortably in the wearer ear. The boom 12 is pivotable up or down to point the microphone 10 toward the corner of the wearer mouth. The headset 2 can be worn on either ear by adjusting the boom 12. To switch the headset configuration so that it can be worn on the opposite ear, the boom 12 is pivoted into an upright position, and the boom 12 and the receiver 8 are then rotated to the other side of the earloop housing 14.

Earloop housing 14 includes a first surface 4 on the left side of the housing (also referred to herein as the "left surface") and a second surface 6 on the right side of the housing (also referred to herein as the "right surface"). As shown in FIGS. 1A and 1B, when headset 2 is worn on the right ear, left surface 4 is in contact with the wearer head and right surface 6 faces outward. In contrast, as shown in FIGS. 2A and 2B, when headset 2 is worn on the left ear, right surface 6 is in contact with the wearer head and left surface 4 faces outward.

Headset 2 may also includes status indicator LEDs, power on/off buttons, mute control, call control buttons, volume control buttons, etc. Various different embodiments of headset 2 are described in further detail below.

Figure 6:
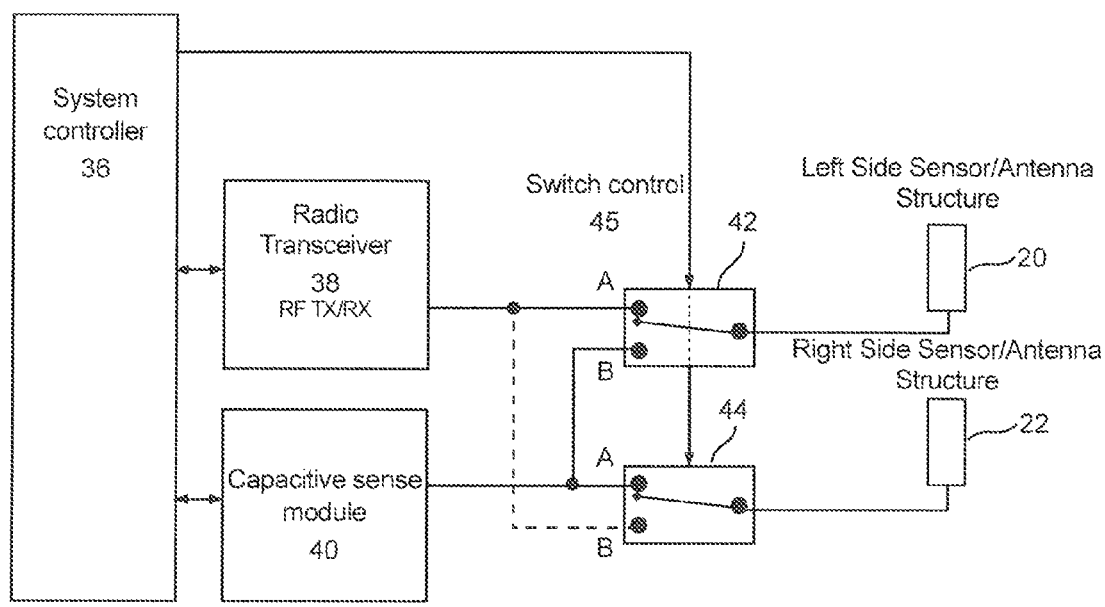
FIG. 6 illustrates a simplified block diagram of a headset in one example.

FIG. 3 illustrates a rear view of the headset 2 in one example implementation. FIG. 6 illustrates a simplified block diagram of the headset 2 shown in FIG. 3 in one example. In the example shown in FIG. 3, headset 2 includes a housing 14 having a first surface 4 adapted to contact a user head when the housing 14 is worn on a user right ear and a second surface 6 adapted to contact the user head when the housing is worn on a user left ear.

A conductive material 20 is disposed on or in proximity to the first surface 4, the conductive material 20 operable as a capacitive sensor or an antenna. A conductive material 22 is disposed on or in proximity to the second surface 6, the conductive material 22 operable as a capacitive sensor or an antenna. In one example, the conductive material 20 and the conductive material 22 are a stamped metal. In a further example, the conductive material 20 or the conductive material 22 comprise copper tape.

In one example, the conductive material 20 is configured to operate as a capacitive sensor and the conductive material 22 is configured to operate as an antenna when the housing 14 is worn on the user right ear, and the conductive material 20 is configured to operate as an antenna and the conductive material 22 is configured to operate as a capacitive sensor when the housing 14 is worn on the user left ear.

Referring again to FIG. 6, the headset 2 includes a system controller 36 in communication with a radio transceiver 38 and capacitive sense module 40. System controller 36 controls switch 42 and switch 44 via switch control line 45. Switch 42 is arranged to switch the conductive material 20 between a radio transceiver 38 and a capacitive sense module 40. Switch 44 is arranged to switch the conductive material 22 between the radio transceiver 38 and the capacitive sense module 40. Radio transceiver 38 is coupled to the conductive material 20 when the housing 14 is worn on the user left ear and coupled to the conductive material 22 when the housing 14 is worn on the user right ear.

In one example, the headset 2 further includes a printed circuit board assembly 46 where the conductive material 20 is located on a first side of the printed circuit board and the conductive material 22 is located on a second side (i.e., the opposite side) of the printed circuit board assembly 46.

In operation, the system controller 36 operates the switch control line 45 to either set the switches 42, 44 to position A or B. With the switches 42, 44 set to position A, the left hand side sensor/antenna structure (conductive material 20) will be operated as an antenna and the right hand side sensor/antenna structure (conductive material 22) will operate as a capacitive sensor. Conversely, when the switches 42, 44 are set to position B, the right hand side sensor/antenna structure (conductive material 22) will operate as an antenna and the left hand side sensor/antenna structure (conductive material 20) will operate as a capacitive sensor.

The system controller 36, transceiver 38, and capacitive sensor modules 40 can be separate devices or may be integrated on to the same piece of silicon. In one example, the headset may utilize an integrated controller and transceiver and separate capacitive sense devices. In a further example, system controller 36, transceiver 38, and capacitive sensor modules 40 are integrated on the same piece of silicon. Similarly, the switching function may be integrated. If separate switches are employed, in one example an RF MMIC switch such as the NEC UPG152TA is used.

Switching timing will be dependent on device application and the radio system(s) employed, but typically takes place during an idle/low activity state where switching could take place between transmit (TX) and receive (RX) packet transmission/reception. Switching speed would not have to coincide directly with packet TX/RX; hence multiple TX/RX events could occur before switching between left hand (LHS) and right hand (RHS) states.

The antenna/sensor structures (i.e., conductive materials 20, 22) are formed from stamped metal or from any conductive material. For example, the antenna/sensor structures can be printed on the inside of the plastics using conductive inks. In one example, the two antenna/sensor structures are mounted directly onto each side of the PCBA. Almost any conductive structure can be used as a capacitive sensor, including an antenna. For example, the antenna may be an inverted L antenna. In one example, the capacitive sensor element is formed using a self-adhesive piece of copper tape.

When operated as capacitive sensors, conductive materials 20, 22 may be utilized to determine whether the headset is donned (i.e., worn on the ear) or doffed (i.e., not worn on the ear). When a capacitive sensor is placed in proximity to the user skin, the capacitive sensor detects an increase in capacitance. The electrically conductive materials can either contact the user's ear or be sufficiently close to the user's ear to permit detection of capacitance as discussed below. The electrically conductive materials 20, 22 can be considered electrodes while the user's ear can be considered the opposing plate of a capacitor with the capacitance Ce. In one example, a touch sensing system is electrically connected to the electrode, and the touch sensing system determines whether the electrode is touching the user's ear based on the capacitance Ce when the electrode is touching the ear and when the electrode is not. In one example, a microprocessor receives signals from the electrode and includes interface firmware and touch sensing firmware to acquire and analyze the measured capacitance of the electrode. The doffed or donned state of the headset is determined based on whether the electrode is touching the user's ear. When a headset is properly worn, several surfaces of the headset touch or are in operable contact with the user. These touch/contact points can be monitored and used to determine the donned or doffed state of the headset. If the electrode is touching the user's ear or in close proximity to the user's ear, the headset is determined to be donned whereas if the electrode is greater than a predetermined distance from the user's ear the headset is determined to be doffed.

Figure 7A:
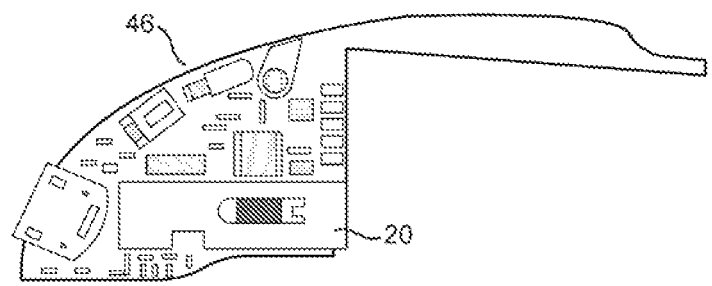
FIGS. 7A and 7B illustrates a top and bottom view, respectively, of a printed circuit board having a first conductive material on a top side of the printed circuit board and a second conductive material on a bottom side of the printed circuit board.
Figure 7B:
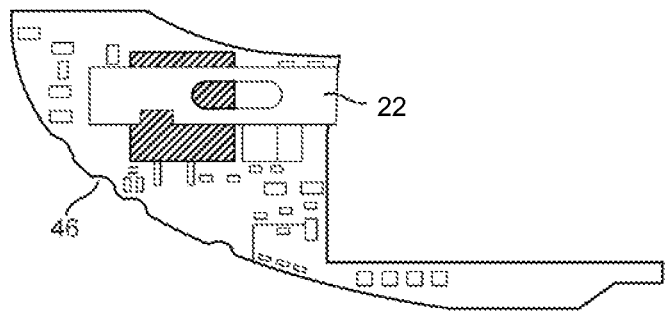
Figure 7C:
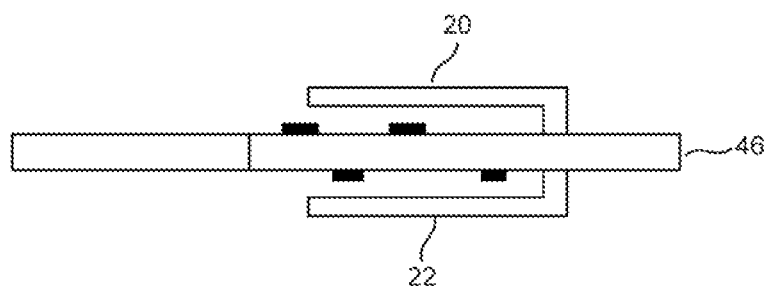
FIG. 7C illustrates a side view of the printed circuit board, first conductive material, and the second conductive material, shown in FIGS. 7A and 7B.

FIGS. 7A and 7B illustrates a top and bottom view, respectively, of a printed circuit board 46 having a conductive material 20 on a top side of the printed circuit board assembly 46 and a conductive material 22 on a bottom side of the printed circuit board assembly 46. FIG. 7C illustrates a side view of the printed circuit board assembly 46, conductive material 20, and the conductive material 22, shown in FIGS. 7A and 7B. In one example, conductive material 20 is a stamped metal antenna and conductive material 22 is a stamped metal antenna. In the example shown in FIGS. 7A-7C, printed circuit board assembly 46 is placed within the housing 14 such that conductive material 20 is in proximity to left surface 4 and conductive material 22 is in proximity to right surface 4.

Figure 4:
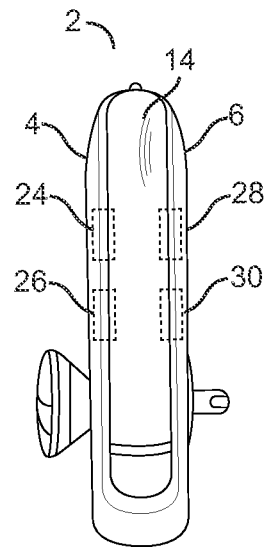
FIG. 4 illustrates a rear view of the headset shown in FIGS. 1A and 1B in a further example.
Figure 8:
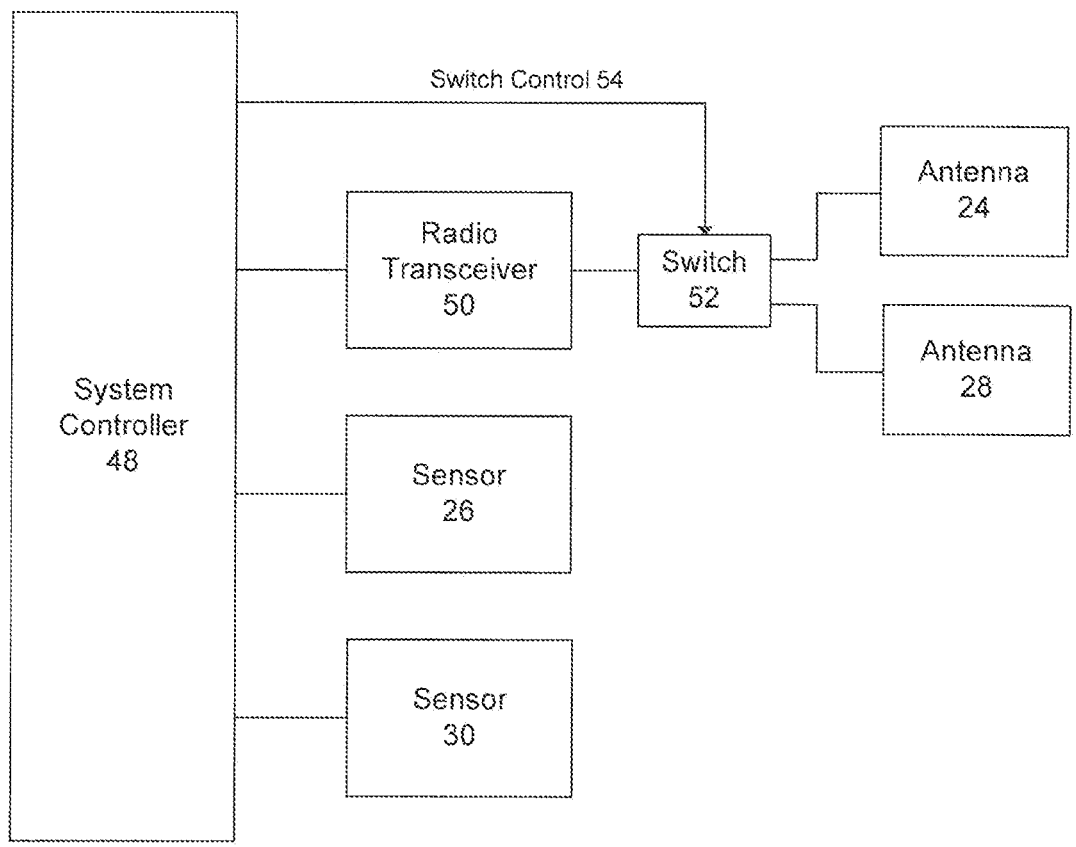
FIG. 8 illustrates a simplified block diagram of a headset in a further example.

FIG. 4 illustrates a rear view of the headset 2 in a further example embodiment. FIG. 8 illustrates a simplified block diagram of the headset 2 shown in FIG. 4 in one example. In the example shown in FIG. 4, headset 2 includes a housing 14 having a first surface 4 adapted to contact a user head when the housing 14 is worn on a user right ear and a second surface 6 adapted to contact the user head when the housing 14 is worn on a user left ear. The headset 2 includes a sensor 26 disposed on or in proximity to the first surface 4, and a sensor 30 disposed on or in proximity to the second surface 6. In a further example, the sensor 26 or the sensor 30 are formed from copper tape. The headset 2 further includes an antenna 24 disposed on or in proximity to the first surface 4, and an antenna 28 disposed on or in proximity to the second surface 6. Antenna 24 and antenna 28 may be a variety of types of antennas. In one example, the antenna 24 and the antenna 28 are stamped metal antennas. In one example, the antenna 24 and the antenna 28 are inverted-F antennas.

Generally, an inverted-F antenna includes an inverted and horizontally disposed F-shaped electrically conductive structure, which is configured over a ground plane formed on a PCB. The F-shaped structure includes an inverted-L element having a vertical ground leg and a long horizontal arm, and a vertical radio frequency (RF) feed leg. The horizontal arm has a length L. It is configured so that it is at a height h above the ground plane. A first end of the vertical ground leg is coupled to a first end of the horizontal arm, and a second end of the vertical ground leg is coupled to the ground plane. The RF feed leg has a first end that is coupled to the horizontal arm, and a second end that is coupled to RF circuitry on the PCB.

Referring again to FIG. 8, the headset includes a system controller 48 in communication with a radio transceiver 50, sensor 26, and sensor 30. System controller 48 controls a switch 52 via switch control 54. Switch 52 is arranged to switch between use of antenna 24 and antenna 28 by radio transceiver 50. System controller 48 is configured to utilize the antenna 24 during a first wireless transmission responsive to a detection that the second surface 6 is in contact with the user head and utilize the antenna 28 during a second wireless transmission responsive to a detection that the first surface 4 is in contact with the user head. In one example, the detection that the second surface 6 is in contact with the user head is responsive to an output signal from the sensor 30 and detection that the first surface 4 is in contact with the user head is responsive to an output signal from the sensor 26.

In one example, the sensor 26 is operable as a user interface input responsive to the detection that the second surface 6 is in contact with the user head. Similarly, the sensor 30 is operable as a user interface input responsive to the detection that the first surface 4 is in contact with the user head. In one example, the headset 2 further includes a printed circuit board wherein the antenna 24 is located on a first side of the printed circuit board and the antenna 28 is located on a second side of the printed circuit board.

Figure 5:
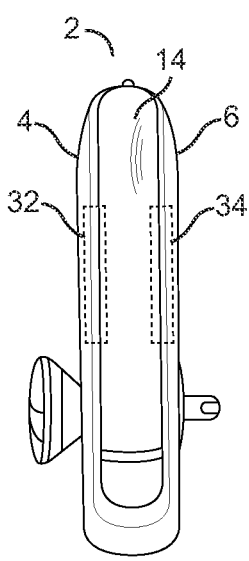
FIG. 5 illustrates a rear view of the headset shown in FIGS. 1A and 1B in a further example.
Figure 9:
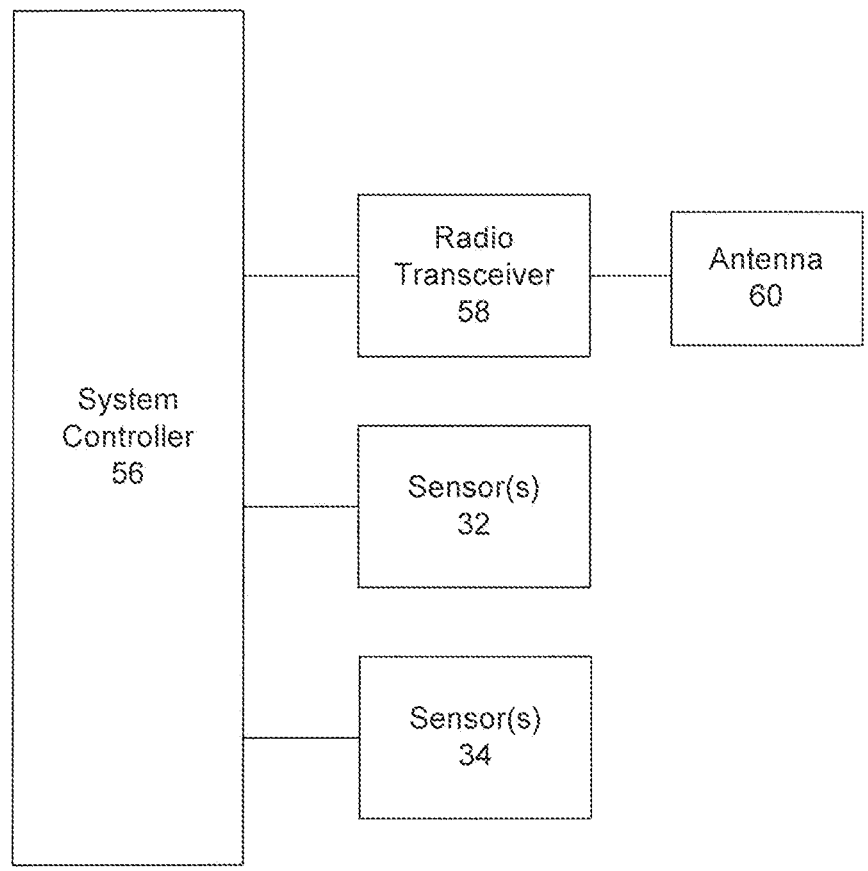
FIG. 9 illustrates a simplified block diagram of a headset in a further example.

FIG. 5 illustrates a rear view of the headset 2 in a further example embodiment. FIG. 9 illustrates a simplified block diagram of the headset 2 shown in FIG. 5 in one example. In one example, a headset 2 includes a housing 14 having a first surface 4 adapted to contact a user head when the housing 14 is worn on a user right ear and a second surface 6 adapted to contact the user head when the housing 14 is worn on a user left ear. A sensor 32 is disposed on or in proximity to the first surface 4, the sensor 32 adapted to operate as a donned or doffed detector when the headset 2 is worn on the user right ear and operate as a user interface when the headset 2 is worn on the user left ear. For example, when operated as a user interface the sensor 32 receives a user headset control input via a user finger. In one example, the user input is a volume control action by the user. In further examples, the user input may be associated with power on/off actions, mute control, or other call control actions.

A sensor 34 is disposed on or in proximity to the second surface 6, the sensor 34 adapted to operate as a donned or doffed detector when the headset 2 is worn on the user left ear and operate as a user interface when the headset 2 is worn on the user right ear. For example, when operated as a user interface the sensor 34 receives a user headset control input via a user finger. In one example, the sensor 32 is a capacitive sensor and the sensor 34 is a capacitive sensor.

When operated as a user interface, sensor 32 and sensor 34 may take the form, for example, of a scroll strip, touch pad, or button. Users generally operate devices with touch sensors by placing the user's finger on or near the sensing region of a desired touch sensor disposed on the electronic device housing. The user's finger on the sensing region results in a capacitive effect upon a signal applied to the sensing region. This capacitive effect is detected by the electronic device, and correlated to positional information, motion information, or other similar information of the user's finger relative to the touch sensor sensing region. This positional information or motion information is then processed to determine a user desired input action, such as a select, scroll, or move action. In one example, sensors 32, 34 are operable as capacitive touch sensors. For example, the touch sensors may be charge transfer sensing capacitance sensors for proximity detection. The touch sensors may respond to voltage, current, or charge to detect position or proximity. The touch sensors are arranged to output information to a processor, including whether the sensors are touched and a signal indicating the proximity of a user's finger to the sensors. In a further example, multiple sensors are placed on each side of the headset to increase functionality of the user input interface.

Figure 10:
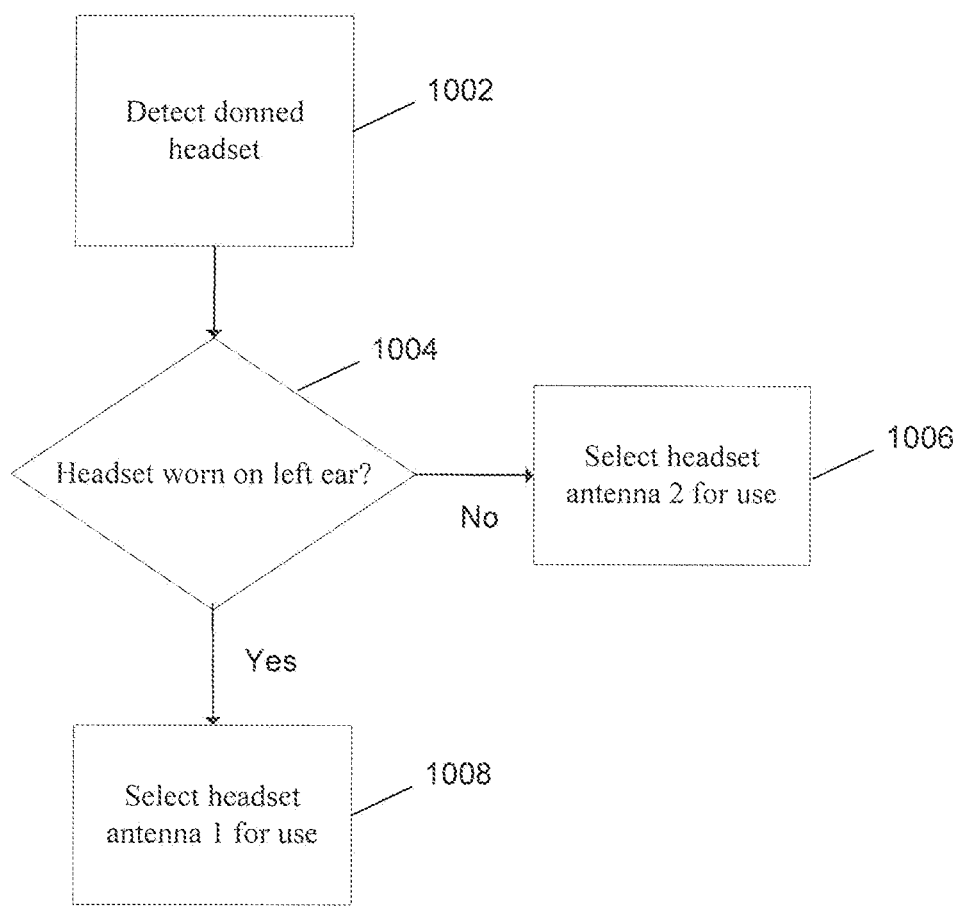
FIG. 10 is a flow diagram illustrating a method for antenna selection in one example.

FIG. 10 is a flow diagram illustrating a method for antenna selection in one example. The method for selecting an antenna for use by a headset includes detecting whether a headset is being worn on a left ear or a right ear, the headset including a first antenna and a second antenna. Responsive to detecting the headset is being worn on a left ear, the first antenna is selected for use. Responsive to detecting the headset is being worn on a right ear, the second antenna is selected for use.

At block 1002, a donned headset is detected. The headset includes a headset antenna 1 and a headset antenna 2. At decision block 1004, it is determined if the headset is being worn on the left ear. If no at decision block 1004 (i.e., the headset is being worn on the right ear), at block 1006 the headset antenna 2 is selected for use. If yes at decision block 1004, at block 1008 the headset antenna 1 is selected for use.

In one example, detecting whether a headset is being worn on a left ear or a right ear is based on sensing whether a first headset housing surface or a second headset housing surface is in contact with a user. The headset includes a first sensor disposed on or in proximity to a first headset housing surface and a second sensor disposed on or in proximity to a second headset housing surface. In a further example, responsive to detecting the headset is being worn on the left ear, the first sensor is configured to operate as a user interface input device, and responsive to detecting the headset is being worn on the right ear, the second sensor is configured to operate as a user interface input device.

Figure 11:
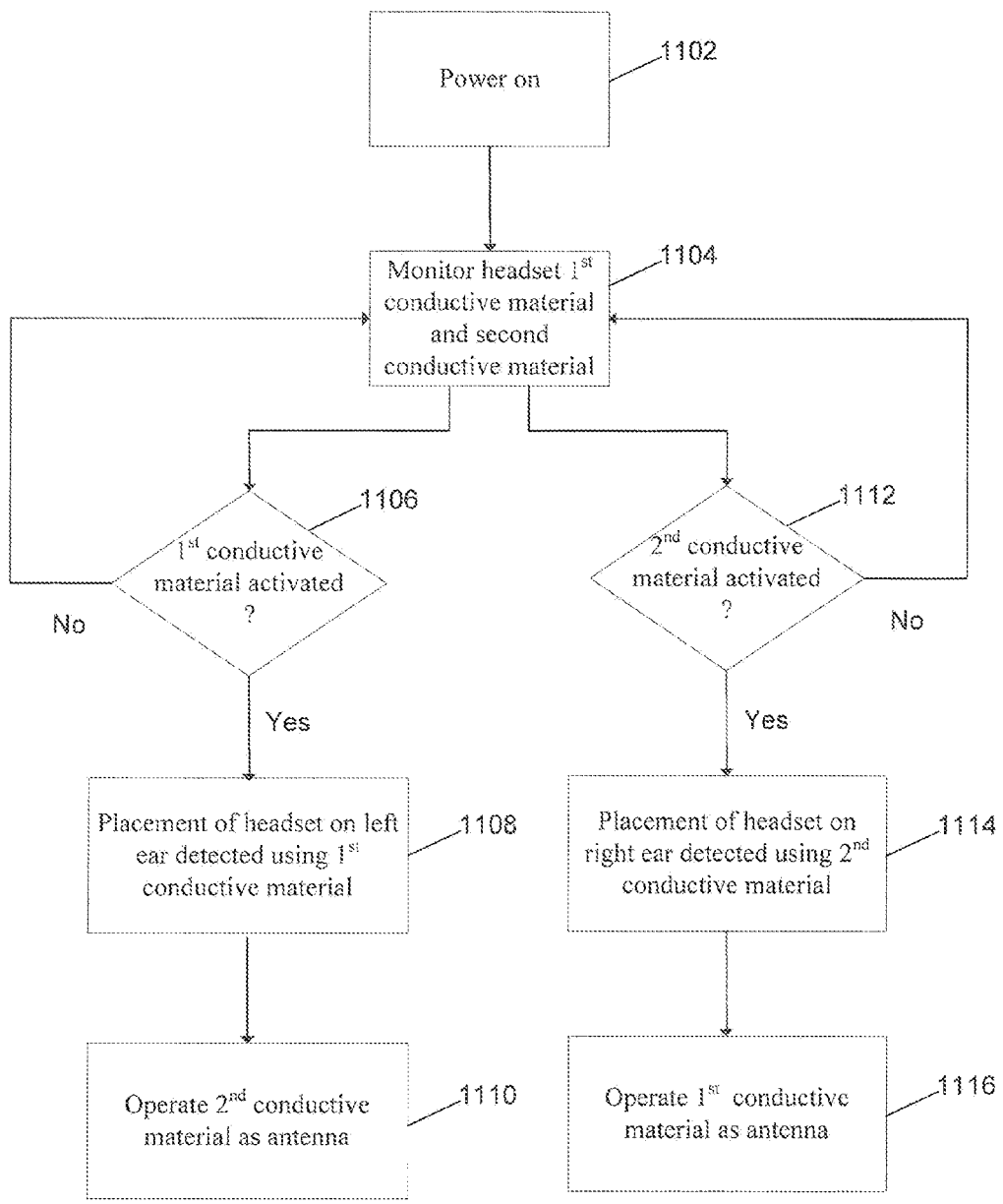
FIG. 11 is a flow diagram illustrating a method for antenna operation in one example.

FIG. 11 is a flow diagram illustrating a method for antenna operation in one example. At block 1102 the headset is powered on. At block 1104, a headset first conductive material conductive material operable as a first sensor is monitored and a headset second conductive material operable as a second sensor is monitored. In one example, the first conductive material is disposed in proximity to a first surface of a headset housing and the second conductive material is disposed in proximity to a second surface of the headset housing. In one example, the first conductive material and the second conductive material are a stamped metal or a copper tape.

At decision block 1106, it is determined if the first conductive material has been activated. If yes at decision block 1106, at block 1108 placement of the headset on the wearer left ear is detected. If no at decision block 1106, the process returns to block 1104. Following block 1108, at block 1110, the second conductive material is operated as an antenna.

At decision block 1112, it is determined if the second conductive material has been activated. If yes at decision block 1112, at block 1114, placement of the headset on the wearer right ear is detected. If no at decision block 1112, the process returns to block 1104. Following block 1114, at block 1116, the first conductive material is operated as an antenna.

Figure 12:
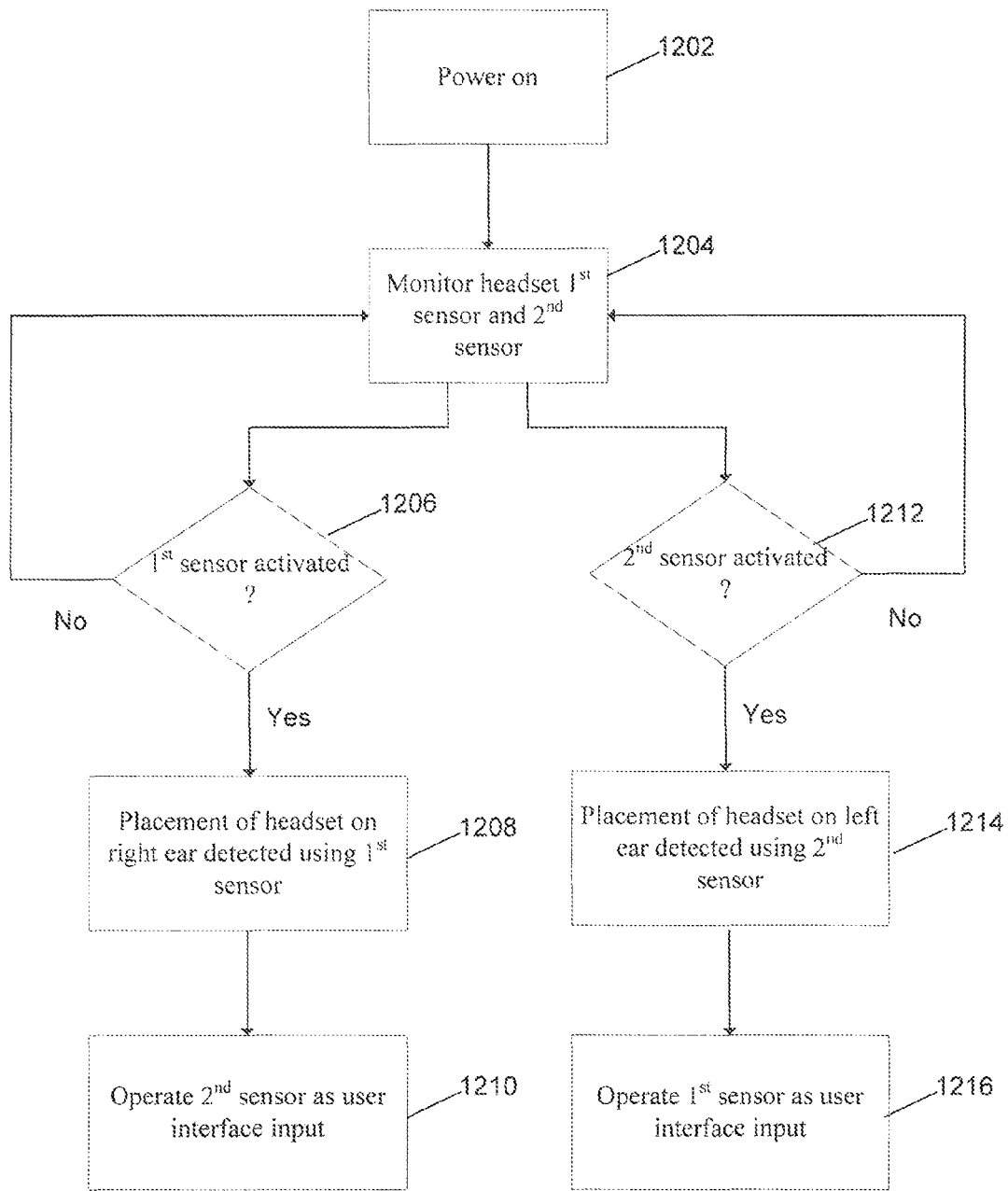
FIG. 12 is a flow diagram illustrating a method for headset operation in one example.

FIG. 12 is a flow diagram illustrating a method for headset operation in one example. At block 1202 the headset is powered on. At block 1204, a headset first sensor is monitored and a headset second sensor is monitored. In one example, the first sensor is disposed in proximity to a first surface of a headset housing and adapted to operate as a donned or doffed detector when the headset is worn on the user right ear. The second sensor is disposed in proximity to a second surface of the headset housing and adapted to operate as a donned or doffed detector when the headset is worn on the user left ear. In one example, the first sensor and the second sensor are capacitive sensors.

At decision block 1206, it is determined if the first sensor has been activated. If yes at decision block 1206, at block 1208 placement of the headset on the wearer right ear is detected. If no at decision block 1206, the process returns to block 1204. Following block 1208, at block 1210, the second sensor is operated as a user interface input.

At decision block 1212, it is determined if the second sensor has been activated. If yes at decision block 1212, at block 1214 placement of the headset on the wearer left ear is detected. If no at decision block 1212, the process returns to block 1204. Following block 1214, at block 1216, the first sensor is operated as a user interface input. In one example, the first sensor and the second sensor receive user input via a user finger, such as a volume control action by the user.

Figure 13:
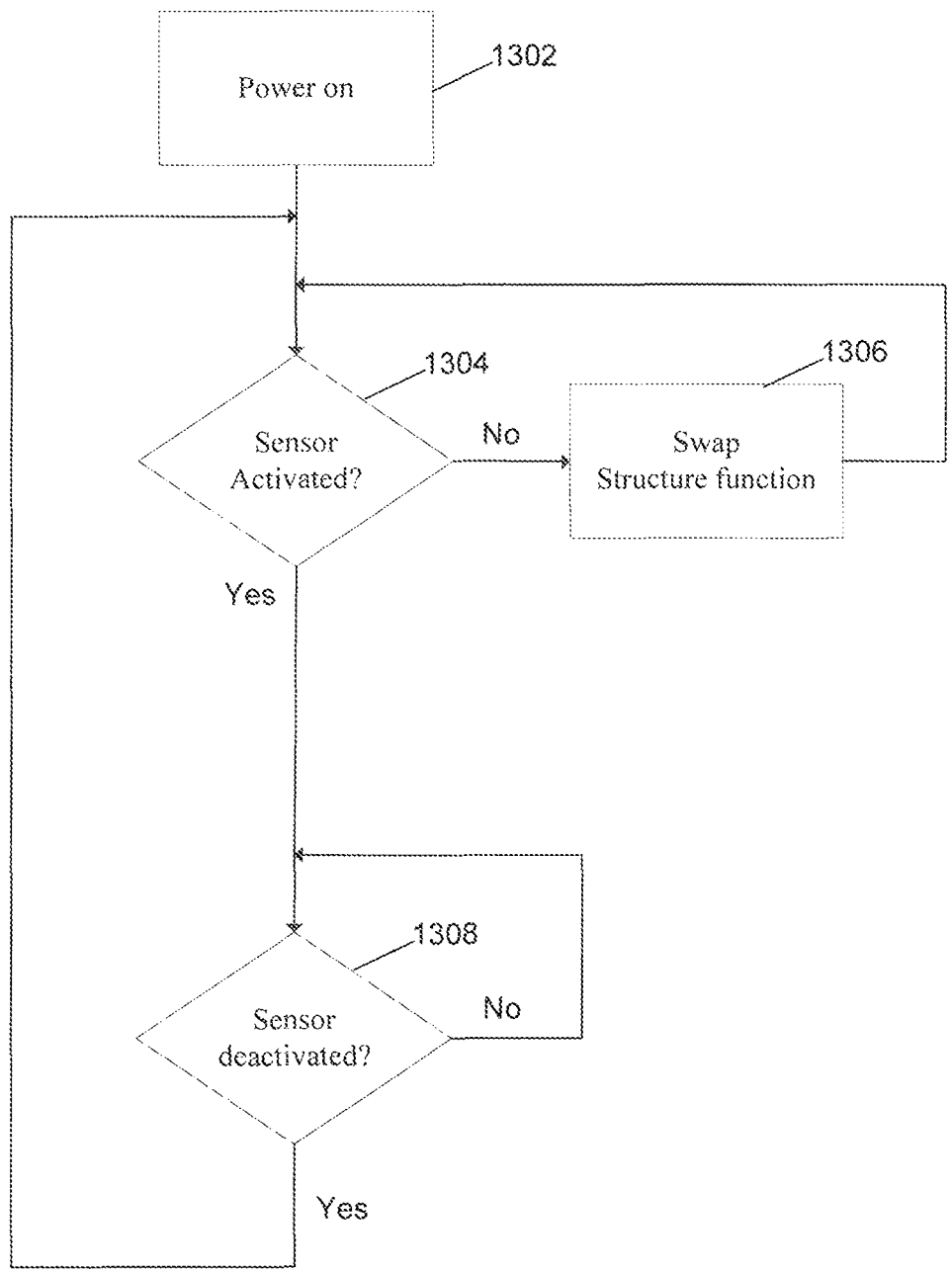
FIG. 13 is a flow diagram illustrating a method for headset operation in a further example.

FIG. 13 is a flow diagram illustrating a method for headset operation in a further example. A headset includes a first structure configurable and operable as a sensor or an antenna. The headset includes a second structure configurable and operable as a sensor or an antenna. The first and second structures are mounted on the left and right hand sides of the headset body, respectively.

At block 1302, the headset is powered on and one structure is configured as a sensor and the other configured as an antenna. The role of each structure is swapped periodically until one of the sensors is activated at block 1304, indicating that the headset is being worn or has been placed on/against a dielectric material. If no sensor has been activated, at block 1306 the role of each structure as either antenna or sensor continues to be swapped at block 1306.

When detection occurs, the role of the structures are fixed such that the structure configured as the sensor continues to operate as a sensor and the structure configured as the antenna continues to operate as the antenna. The role of each structure will continue in this configuration until it is detected at block 1308 that the sensor is deactivated, at which point the periodic role swapping resumes.

While the exemplary embodiments of the present invention are described and illustrated herein, it will be appreciated that they are merely illustrative and that modifications can be made to these embodiments without departing from the spirit and scope of the invention. For example, the type of device may vary. Thus, the scope of the invention is intended to be defined only in terms of the following claims as may be amended, with each claim being expressly incorporated into this Description of Specific Embodiments as an embodiment of the invention.

What is claimed is:

1. An electronic device comprising:
   a housing having a first surface adapted to contact a user body and a second surface adapted to contact the user body;
   a first conductive material disposed on or in proximity to the first surface, the first conductive material operable as a first capacitive sensor or a first antenna, wherein the first antenna is configured to transmit and receive first wireless signals; and
   a second conductive material disposed on or in proximity to the second surface, the second conductive material operable as a second capacitive sensor or a second antenna, wherein the second antenna is configured to transmit and receive second wireless signals;
   wherein the first conductive material is configured to operate as the first capacitive sensor and the second conductive material is configured to operate as the second antenna when the housing is worn on the user right ear; and
   wherein the first conductive material is configured to operate as the first antenna and the second conductive material is configured to operate as the second capacitive sensor when the housing is worn on the user left ear.

2. The electronic device of claim 1, wherein the electronic device is a headset and the first surface is adapted to contact a user head when the housing is worn on a user right ear and the second surface is adapted to contact the user head when the housing is worn on a user left ear.

3. The electronic device of claim 2, further comprising a radio transceiver coupled to the first conductive material when the housing is worn on the user left ear and coupled to the second conductive material when the housing is worn on the user right ear.

4. The electronic device of claim 1 further comprising a printed circuit board wherein the first conductive material is located on a first side of the printed circuit board and the second conductive material is located on a second side of the printed circuit board.

5. The electronic device of claim 1, wherein the first conductive material and the second conductive material are a stamped metal.

6. The electronic device of claim 1, wherein the first conductive material or the second conductive material comprise copper tape.

7. The electronic device of claim 1, further comprising:
   a first switch arranged to switch the first conductive material between a radio transceiver and a capacitive sense module; and
   a second switch arranged to switch the second conductive material between the radio transceiver and the capacitive sense module.

8. A method for selecting an antenna for use by an electronic device comprising:
   alternating operation of a first conductive material as a first capacitive sensor and a first antenna;
   alternating operation of a second conductive material as a second capacitive sensor and a second antenna;
   detecting a first capacitive sensor output associated with proximity to a user body or a second capacitive sensor output associated with proximity to a user body; and responsive to detecting the first capacitive sensor output operating the second conductive material as an antenna and responsive to detecting the second capacitive sensor output operating the first conductive material as an antenna.

9. The method of claim 8, wherein the electronic device is a headset and the first conductive material is disposed in proximity to a first surface of a headset housing and the second conductive material is disposed in proximity to a second surface of the headset housing.

10. The method of claim 8, wherein the first conductive material and the second conductive material are a stamped metal or a copper tape.

11. A method for selecting an antenna for use by an electronic device comprising:
   detecting proximity of an electronic device to a user body utilizing a first conductive material operable as a first sensor or proximity of the electronic device to the user body utilizing a second conductive material operable as a second sensor;
   responsive to detecting proximity of the electronic device to the user body utilizing the first conductive material, operating the second conductive material as an antenna to transmit and receive second wireless signals; and
   responsive to detecting proximity of the electronic device to the user body utilizing the second conductive material, operating the first conductive material as an antenna to transmit and receive first wireless signals.

12. The method of claim 11, wherein the electronic device is a headset adaptable to be worn on either a user left ear or a user right ear and the first conductive material is disposed in proximity to a first surface of a headset housing and the second conductive material is disposed in proximity to a second surface of the headset housing.

13. The method of claim 11, wherein the first conductive material and the second conductive material are a stamped metal or a copper tape.

* * * * *